United States Patent [19]

Hayes

[11] 4,221,046
[45] Sep. 9, 1980

[54] METHOD FOR ASSEMBLING A BRUSH CAGE

[75] Inventor: Clyde M. Hayes, Lambertville, Mich.

[73] Assignee: Eltra Corporation, Toledo, Ohio

[21] Appl. No.: 936,288

[22] Filed: Aug. 7, 1978

Related U.S. Application Data

[62] Division of Ser. No. 775,084, Mar. 7, 1977, Pat. No. 4,114,061.

[51] Int. Cl.³ .............................................. H02K 15/10
[52] U.S. Cl. ....................................... 29/596; 310/239
[58] Field of Search .......................... 29/596, 597, 598; 310/242, 245–247, 239–241, 243, 244

[56] References Cited

U.S. PATENT DOCUMENTS

| 2,760,094 | 8/1956 | Edmundson | 310/244 X |
| 3,510,709 | 5/1970 | Walker et al. | 310/239 |

Primary Examiner—Carl E. Hall
Attorney, Agent, or Firm—James P. DeClercq

[57] ABSTRACT

A brush cage for an electric motor wherein the brush sets are mounted on two assemblies. One assembly is mounted to the frame and the second assembly is mounted to a removable frame end plate, which when removed, provides access to the first assembly and commutator. Each assembly includes an electrically conductive ring upon which the brushes are mounted. The brushes are electrically interconnected through the ring upon which they are mounted. The rings are in a spaced relation to each other along the commutator rotational axis and are on substantially parallel planes which are perpendicular to that axis. The brushes on one ring fit between the brushes on the other ring so as to be disposed around the commutator in an inter-leafed pattern within the space between the two rings.

2 Claims, 2 Drawing Figures

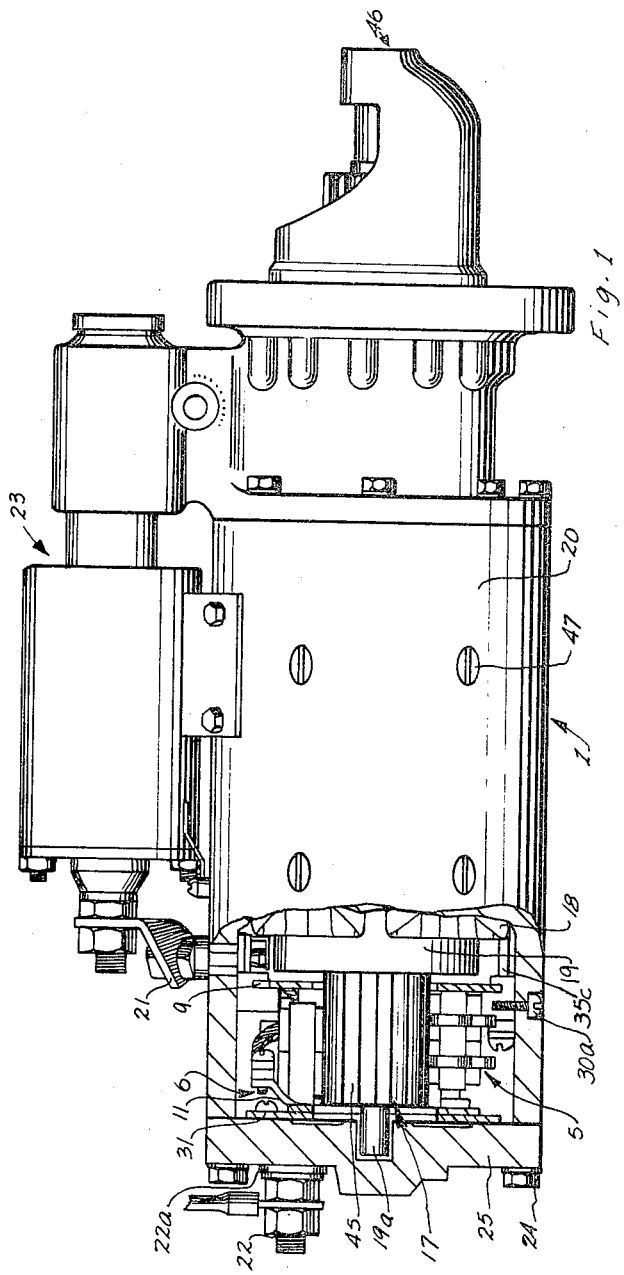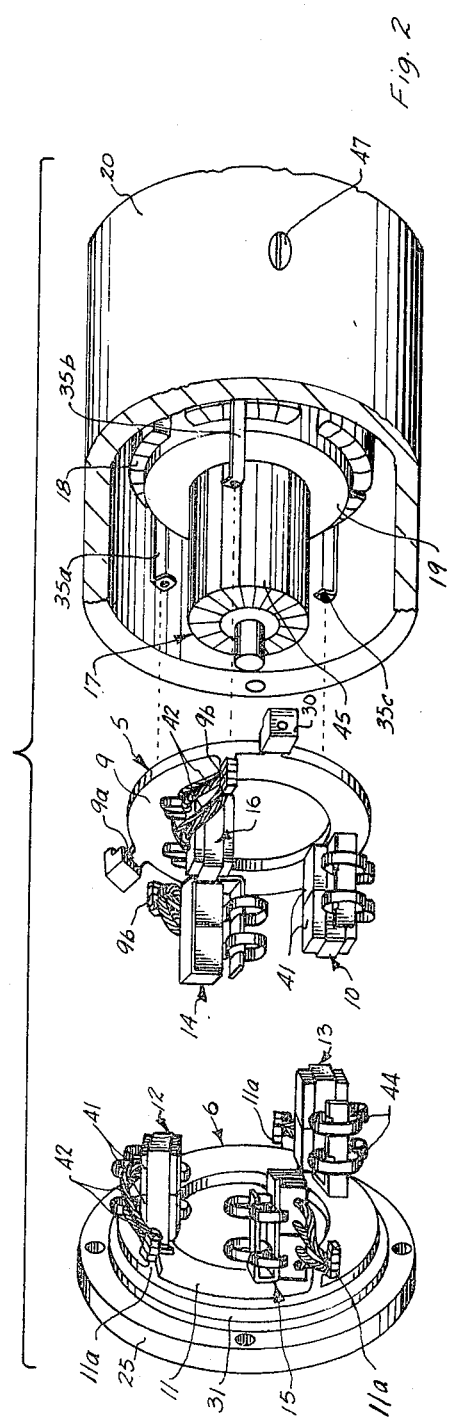

METHOD FOR ASSEMBLING A BRUSH CAGE

This is a division of application Ser. No. 775,084, filed Mar. 7, 1977, now U.S. Pat. No. 4,114,061, issued Sept. 12, 1978.

BACKGROUND OF THE INVENTION

This invention relates to dynamoelectric machines and particularly to a brush cage for mounting commutator brushes in such a machine.

In the past, it has been common practice to mount the commutator brushes in a single brush cage mounted either on the motor end plate or on the motor frame around the commutator. In either case, it may be necessary to use excessively long leads from the brushes to the stator terminals to make the necessary connections before mounting the end plate. Alternatively, it may be necessary to provide access ports to the brushes, so that the electrical connections can be made after the plate is mounted. In multi-brush, small motors the limited available space can make these procedures quite difficult. A representative example of this particular approach is found in U.S. Pat. No. 3,510,709. Moreover, mounting the brush cage in this manner is disadvantageous in that it complicates machine assembly and inhibits the accessibility of the brushes and commutators for servicing and replacement. In addition, the bends and turns on the wires connecting the brushes and stator branches increase the effective brush resistance and deteriorate motor performance. Also, the access ports make it increasingly difficult and expensive to construct a watertight motor housing around the commutator and brush cage.

SUMMARY OF THE INVENTION

In the brush cage of the present invention, the individual brushes are mounted on two parallel, electrically conductive rings. One ring is mounted on the motor frame and each brush thereon is connected to a terminal on the ring which is attached to a strap lead from its corresponding stator branch. The second ring is mounted on a removable motor frame end plate. The brushes mounted on a ring are electrically connected to the ring, whereby the brushes on that ring are electrically interconnected. This distributes the brush current to extend brush life and minimize armature circulating currents, which arise when the brushes are at different voltages, due to a resistance imbalance between the stator branches.

The two rings are concentric with the armature axis of rotation, and on substantially parallel planes which are perpendicular to the armature axis so as to be in a spaced relation to each other. The brushes which are mounted on each ring are disposed at equal angles around the commutator within the space between the two rings.

The necessary electrical connections from the individual stator branches to the brushes on the frame mounted ring are completed with the end plate removed. Because the brushes are thereby easily accessible, the stator branch leads are straps or bars and are cut to the precise length necessary.

Thus, an object of the present invention is to provide a brush cage particularly adapted to a multi-brush machine which does not require frame access ports and slots to complete the brush connections.

It is another object of the present invention to provide a brush cage which facilitates brush and commutator assembly and servicing procedures.

It is an additional object of the present invention to provide a brush cage adapted for use in the construction of a water tight motor frame.

DESCRIPTION OF THE DRAWING

FIG. 1 is a side view of a six brush six pole direct current starting motor. The motor end containing the commutator is shown in a cut-away view to depict the brush cage according to the present invention assembled around the commutator, and FIG. 2 is an exploded view of the motor end in perspective, which shows the two brush holder assemblies which comprise the brush cage of the present invention, each assembly contains three brush holders.

DETAILED DESCRIPTION

In FIG. 1 a starter motor 1 and its associated starter drive assembly 46 and solenoid 23 are shown. Motor 1 includes a cylindrical frame 20 and a removable end plate 25, which is mounted on the frame by fasteners 24. A stator or field assembly 18 is mounted on the inside wall of frame 20 by fasteners 47. An armature 19 is mounted for rotation with its axis concentric with frame 20 and stator 18. Armature 19 includes a commutator 17, which is journaled at end 19a in end plate 25. Stator 18, in the embodiment shown, comprises a six pole winding which therefore has three electrically parallel coil branches, each branch having two terminals. There are two power input terminals 21 and 22 across which a battery (not shown) is connected and one terminal from each stator branch is attached to terminal 21. Armature 19, like stator 18, is comprised of a six pole coil arrangement which is connected to the various bars 45 of commutator 17. Commutator 17 causes current reversal in selected branches of armature 19 so as to change the armature flux direction as it rotates.

Two brush carrying assemblies 5 and 6, which are mounted around commutator 17, comprise the brush cage of the present invention. Each assembly contains three brush holders or boxes: Assembly 5 contains brush holders 10, 14 and 16 and assembly 6 contains brush holders 12, 13 and 15. In each brush holder are two contact bars 41 that rub on commutator 17. Each brush holder, for example, holder 13, includes two springs 44 which press the brush bars 41 against commutator 17. Each holder is electrically conductive, so that holder and brush therein are electrically interconnected. Of course, there are a variety of brush box arrangements known in the art that can be substituted for those specifically in the preferred embodiment without altering the present invention.

Referring specifically to assembly 5, brush holders 10, 14 and 16 are mounted on a ring 9 which contains three tabs 9a along its outer edge. Two of these tabs can be seen in FIG. 2; however the third tab is hidden from view by holder 10.

Ring 9 is made of an electrically conductive material, such as copper or brass. Adjacent to each of the brush holders 10, 14 and 16 there are terminals 9b which are outwardly extending portions of ring 9 that are adapted to receive a terminal screw, as shown, and which provide electrical connection to ring 9. It should be noted that the particular terminal 9b adjacent holder 10 cannot be seen in FIG. 2, as it is hidden by the holder. Each brush holder 10, 14 and 16 is riveted on ring 9 so that the ring and holder are electrically connected. As shown, pigtail leads 42 from each brush 41 is connected to an adjacent terminal 9b, with the result being that the brushes, holders and ring are electrically interconnected. The brush holders 10, 14 and 16 are spaced apart at equal angles of 120° around the armature axis. Ring 9, therefore, can be viewed as a bus-bar between holders 10, 14 and 16, with connection points through the rivet on each holder and through terminals 9b.

In high current applications, it is suggested that ring 9 be electrically connected to the holders in the aforesaid manner so as to distribute the brush current equally among the brushes so that each brush is at substantially the same DC voltage. This minimizes any armature circulating currents resulting from resistance imbalances between the three branches of stator 18. An electrically insulating mounting pad or block 30 is affixed to each tab 9a and is adapted to receive the screw 30a, by which the entire assembly 5 is fastened in place on frame 20.

Three stator terminals 35a, 35b and 35c extend axially outward from frame 20, as shown. These are the remaining terminal leads from each branch of stator 18 and each is connected to the particular tab 9b adjacent its associated brush holder. Thus lead 35a connects to the tab 9b adjacent holder 14; lead 35b connects to the tab 9b adjacent holder 16 and lead 35a connects to the tab 9b adjacent holder 10. As set forth above, the latter tab 9b is not visible in the included drawing. Each of leads 35a, 35b and 35c is a copper bar or strap which is bent at right angles, as shown, and includes a hole to receive the screw associated with each tab 9b.

Assembly 6 likewise includes a ring 11, which is mounted on plate 25. In some motor applications, rings 9 and 11 can be interchangable. The three brush holders 12, 13 and 15 are disposed around the ring, and each holder is riveted to ring 11 to establish electrical contact between the ring and the holders. Three terminals 11a are located around ring 11, and each is associated with one of the brush holders 12, 13 and 15. The terminal 11a adjacent holder 13 is not visible. Terminals 11A are extensions of ring 11 and provide an additional electrical connection point to the ring and brushes. The pigtail leads 42 from each brush 41 on ring 11 is connected to the adjacent terminal 11A, as shown. As with the previously discussed assembly 9, holders 12, 13 and 15 are electrically interconnected so as to distribute the armature current among the brushes and minimize armature circulating currents.

Ring 11 is electrically insulated from frame 25 by an insulating pad 31 (FIG. 1). Ring 11 is riveted to pad 31, which is screwed on to plate 25. Terminal 22 passes through plate 25 and is connected to ring 11. An electrically insulating collar 22A is between terminal 22 and plate 25.

The brush holders on assemblies 5 and 6 are spaced apart at equal angles of 120° around the axis of armature 19. The six brush holders 10, 12, 13, 14, 15 and 16 comprise three brush holder pairs, wherein the brushes in each pair are diametrically opposite. For example, holders 10 and 12 define such a pair.

The two assemblies 5 and 6 can be seen to be in a spaced relation to each other within frame 20. Specifically, the assemblies are on substantially parallel planes which are perpendicular to the rotational axis of armature 19. The six brush holders 10, 12, 13, 14, 15 and 16 are disposed around commutator 17 within the space between the assemblies or specifically in the space between rings 9 and 11, shown generally as 2 in FIG. 1. Because of the pair arrangement described previously, the holders are in an alternating or interleafed arrangement around the commutator 17 whereby each holder fits between two holders in the opposite assembly and is spaced 30° from each holder. For example, holder 12 fits between holders 14 and 16. Consequently, the resulting brush cage achieves maximum space utilization without sacrificing ease of assembly.

From the foregoing it can be appreciated that each assembly, 5 and 6, is mounted independently within the motor 1, and the only internal electrical connections made to assemble the brush cage are those between terminals 9b and stator terminals 35a, 35b and 35c. These connections are made with plate 25 removed, which clearly provides more than ample access. Consequently, terminals 35a, 35b and 35c can be made of the previously described copper bar or strap and appropriately angled to fit directly on to terminal 9b after the assembly 5 is mounted. End plate 25 is then mounted on frame 20 simply by aligning the plate and frame holes. Because the connections are made internally, access ports are not required and the interface between plate 25 and frame 20 can be sealed to make the commutator end of the motor water tight, if desired.

Assembly of the brush cage of the present invention therefore includes the following steps: Assembly 5 is inserted into frame 20 and after being properly aligned, it is fastened to the frame. Each of the stator leads 35a, 35b and 35c is connected to the tab 9b adjacent its corresponding brush holder, as set forth above. Assembly 6 is mounted on end plate 25 and connected to terminal 22. Then plate 25 is placed on the frame and after it is properly aligned, it is fastened in place by screws 24. Upon completion of the aforesaid steps, the brush cage is completely assembled and ready for use.

In the embodiment shown, rings 11 and 9 are electrically conductive because of the high armature current encountered. However, for lower power motors, the brush cage of the present invention can be constructed by using a nonconductive ring which has separate electrical terminals in place of integral terminals 9b and 11a. In such a case, the nonconductive ring can be directly fastened to frame 20, obviating the need for insulating pads 30.

While I have hereinabove described what is at present the preferred embodiment of my invention, it will be obvious to those skilled in the art that there are many possible modifications and variations which can be made thereto, but which are nevertheless equivalent and embrace the true scope and spirit of my invention. Therefore, it is intended that the claims, hereinafter set forth, cover all such modifications, variations and equivalents.

I claim:

1. A method for mounting two brushes around a commutator on a motor having a frame and frame end plate, comprising the steps:
   (a) mounting one brush to a first ring,
   (b) mounting said ring on the frame with the brush oriented towards the frame end plate,
   (c) mounting a second brush on a second ring,
   (d) mounting said second ring on the end plate with the brush oriented towards said first ring, and
   (e) mounting the end plate on the frame end.

2. A method for mounting commutator brushes in a dynamoelectric machine which has a frame, a stator lead and a removable frame end plate, comprising the steps:

(a) mounting a first brush onto the frame and adjacent the commutator, (b) connecting the stator lead to said first brush, then (c) mounting a second brush on the frame end plate, and (d) fastening the plate to the frame end.

* * * * *